(12) United States Patent
Unger

(10) Patent No.: US 8,055,191 B2
(45) Date of Patent: Nov. 8, 2011

(54) METHOD AND STRUCTURE IN SUPPORT OF THE FORMATION OF SUBSTANTIALLY CO-LINEAR WIRELESS DEVICE PAIRINGS AND MITIGATION OF INTERFERENCE EFFECTS IN A DIGITAL MULTI-MEDIA COMMUNICATION ENVIRONMENT

(75) Inventor: Robert Unger, El Cajon, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1012 days.

(21) Appl. No.: 11/948,161

(22) Filed: Nov. 30, 2007

(65) Prior Publication Data

US 2008/0299912 A1 Dec. 4, 2008

Related U.S. Application Data

(60) Provisional application No. 60/932,218, filed on May 30, 2007.

(51) Int. Cl.
*H04B 7/24* (2006.01)
(52) U.S. Cl. .......................................... 455/39; 455/41.3
(58) Field of Classification Search ................. 455/41.2, 455/41.3, 39; 342/267
See application file for complete search history.

(56) References Cited

U.S. PATENT DOCUMENTS

| | | | | |
|---|---|---|---|---|
| 2,257,319 A * | 9/1941 | Williams | ...................... | 398/129 |
| 4,617,570 A * | 10/1986 | Gutleber | ...................... | 342/429 |
| 4,696,053 A | 9/1987 | Mastriani et al. | | |
| 5,471,219 A | 11/1995 | Rodeffer et al. | | |
| 5,737,690 A * | 4/1998 | Gutman | ...................... | 340/7.54 |
| 5,952,966 A * | 9/1999 | Smith | ........................... | 342/373 |
| 6,016,120 A | 1/2000 | McNabb et al. | | |
| 6,218,979 B1 * | 4/2001 | Barnes et al. | .................... | 342/28 |
| 6,487,426 B1 | 11/2002 | Haber | | |
| 6,512,481 B1 * | 1/2003 | Velazquez et al. | ............ | 342/367 |
| 6,529,173 B1 | 3/2003 | Sneitzer et al. | | |
| 6,697,610 B1 | 2/2004 | Tait et al. | | |
| 6,836,242 B1 * | 12/2004 | Batzer et al. | .................. | 342/367 |
| 6,864,847 B2 | 3/2005 | Wensink | | |
| 7,065,373 B2 | 6/2006 | Rodgers et al. | | |
| 7,228,154 B2 | 6/2007 | Champion et al. | | |
| 7,551,893 B2 * | 6/2009 | Fukumoto et al. | ........... | 455/41.2 |
| 7,689,167 B2 * | 3/2010 | Sengupta et al. | ............ | 455/41.2 |
| 2001/0003443 A1 * | 6/2001 | Velazquez et al. | ............ | 342/367 |
| 2001/0031634 A1 | 10/2001 | Mizutani et al. | | |
| 2001/0046258 A1 | 11/2001 | Wise et al. | | |
| 2003/0035386 A1 | 2/2003 | Sullivan | | |

(Continued)

OTHER PUBLICATIONS

ND SatCom, Optimized true antenna pointing for value-adding, boundless, worldwide mobile operation, www.ndsatcom.com, Apr. 21, 2005.

(Continued)

*Primary Examiner* — Lewis West

(57) ABSTRACT

A method and structure that supports the formation of co-linear device pairs and mitigation of undesired interference in a digital multi-media communication environment. Compass orientation information of co-located devices within range of one another in a wireless communication environment is used to determine whether sufficiently co-linear device pairing opportunities exist and may also be used to identify and/or mitigate undesired interference conditions. Various remedial actions may be performed to enhance co-linear device pairing and mitigation action may be taken to mitigation interference between substantially co-linear and co-located devices in the environment.

32 Claims, 11 Drawing Sheets

U.S. PATENT DOCUMENTS

| | | | |
|---|---|---|---|
| 2004/0198401 A1* | 10/2004 | Rodgers et al. | 455/502 |
| 2005/0108646 A1* | 5/2005 | Willins et al. | 715/723 |
| 2006/0246471 A1 | 11/2006 | Elliott et al. | |
| 2007/0030208 A1 | 2/2007 | Linehan | |
| 2011/0092155 A1* | 4/2011 | Piemonte et al. | 455/41.1 |

OTHER PUBLICATIONS

SWE-DISH, SWE-DISH DA150K MIL Drive-Away, www.swe-dish.se, Jan. 1, 2004.

ND SatCom, SkyRAY Light 1200, www.ndsatcom.com, Jan. 1, 2007.

PCT International Search Report and Written Opinion, PCT/US08/64929, Jul. 28, 2008.

State Intellectual Property Office of the People's Republic of China, Application No. 200880018255.3, Office Action issued Mar. 23, 2011 (English translation).

* cited by examiner

METHOD AND STRUCTURE IN SUPPORT OF THE FORMATION OF SUBSTANTIALLY CO-LINEAR WIRELESS DEVICE PAIRINGS AND MITIGATION OF INTERFERENCE EFFECTS IN A DIGITAL MULTI-MEDIA COMMUNICATION ENVIRONMENT

PRIORITY CLAIM

This application claims priority pursuant to 35 U.S.C. §120 to the provisional U.S. patent application filed May 30, 2007 and identified by Application No. 60/932,218, which is hereby incorporated by reference.

COPYRIGHT NOTICE

A portion of the disclosure of this patent document may contain material that is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

It is recognized that in order to save table space and to increase people's mobility and viewing lines in the room, environment, or other space, such as a theater room, it may be desirable to view or otherwise enjoy multimedia on a display using a minimum of wiring. For instance, it may be desirable to mount a projector on the ceiling or to mount a plasma display or liquid crystal high definition (HD) television display on a wall, out of the way and capable of receiving multimedia data for display without the need for wires, since as understood herein among other things data transmission lines often do not exist in ceilings or walls.

Digital multimedia communications encompass the transmission of digital audio/video information from a digital data source, such as a DVD player, video receiver, ATSC tuner, or other computer, to a receiver, such as a flat panel video monitor, television (TV), a digital television (DTV), or other compatible display device, for the purpose of multimedia entertainment, including playing digital movies, games, listening to music, etc. A protocol known as High Definition Multimedia Interface (HDMI) has been developed to support audio/video multimedia communications. HDMI is a digital audio/visual connector interface capable of transmitting uncompressed and compressed streams, and supports the use of audio as well as video data and television-related resolutions.

A wireless link in support of such digital multimedia communications must have a bandwidth that is insufficient to carry either compressed or uncompressed multimedia such as uncompressed high definition (HD) video and compressed multimedia standard definition (SD) video. Moreover the wireless communications preferably has a shorter link that will not extend beyond the immediate location of interest, thus protecting copyright and other intellectual property. There is therefore the need for a very short range, preferably directional, high bandwidth wireless link that is particularly suited for the short range wireless communication of uncompressed multimedia, particularly the rather voluminous genre of multimedia known as HD video.

The present assignee has provided a wireless system that functions in the spectrum between 57 GHz and 64 GHz (hereinafter referenced as the "60 GHz band" or Milli-Meter Wave Communication (MMWC) technology). Characteristics of the 60 GHz radio frequency (RF) spectrum include short range, high directivity (and, hence, inherent security), being highly linear in operation, and large data bandwidth, and MMWC technology may be used to transmit high definition (HD) video in High Definition Multimedia Interface (HDMI) format from a source in a space to a receiver in the space, using a high bandwidth 60 GHz link. As used herein, sources and receivers in a MMWC communication environment or space may also be referred to as "devices." At this frequency the signal has very short range and can be directional such that the video may be transmitted in an uncompressed form such that so much data is transmitted each second that bootlegging the content is essentially untenable.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

Figure 1:
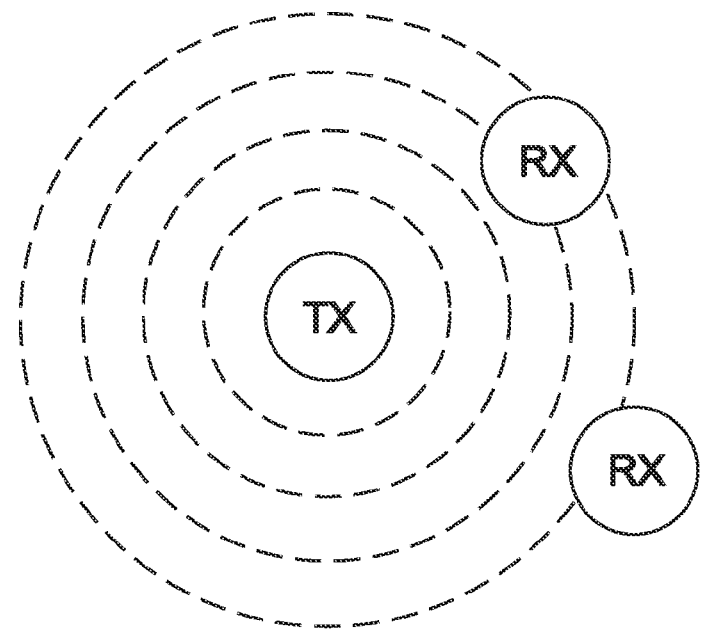
FIG. 1 illustrates the omni-directional nature of a conventional radio, in accordance with the prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Figure 2:
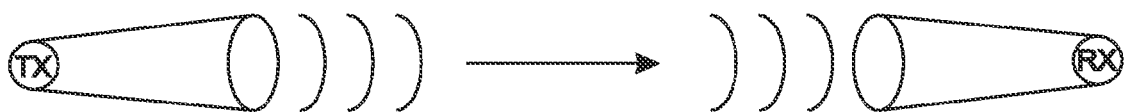
FIG. 2 illustrates the directionality inherent in MilliMeter Wave Communication (MMWC).

Device discovery and setup is an important part of radio operation. It is necessary to determine whether devices within communication range of one another in the environment, and therefore co-located, are friends, foes or neutral with respect to each other. Most conventional radios are omni-directional in that the signal is radiated from the transmitter in all directions simultaneously, providing few choices about sharing space, as illustrated in FIG. 1. Generally, each radio must use a different channel (frequency separation) or a different time slice (time division). This presents the problem of multiple receivers simultaneously picking up a signal transmitter from one transmitter. The RF technology provided by MMWC, conversely, is highly linear in operation, with transmission and reception occurring more optimally in cone formation, as shown in FIG. 2. Generally, the smaller the cone, the more efficient the band utilization that may be achieved. Given the advantages of short range, high directivity and therefore high security, and the large data bandwidth available with MMWC, there is an incentive to address the issues of device discovery and setup of devices in a MMWC environment. It is noted, furthermore, that the compass alignment principles of the invention disclosed herein are applicable in laser (optical) transmission, as well as in MMWC transmission.

The highly linear nature of MMWC and/or laser communications is an important consideration in the setup and discovery phases of operation of devices and also for the avoidance of interference with other MMWC devices co-located in the same environment. The directional aspect of MMWC means that the receiver and the transmitter are substantially aligned towards each other on the same operating line or line of sight so as to be sufficiently co-linear to support wireless communications between the two devices. Moreover, it is desired that no other signal sources share the same communication path so that interference between two substantially co-linear signals does not result or is at least identified and/or mitigated. It can be appreciated that the highly linear and directional attributes of MMWC technology must be taken into account in order to set up desired communication pairings between source and receiver devices in a wireless communication environment or space and to further identify and/or mitigate undesirable interference between signals in the space.

MMWC technology may be applied in a fixed application or a portable application. An example of a fixed application includes transmitting video across a room, where the transmitter and receiver are installed in a permanent fashion at a significant distance from one another, e.g. five to 10 meters. The relationship between the two devices in this example is thus predetermined and assigned. Suppose that each device is looking for its specific partner. If, for some reason, the orientation of the two devices is not such that they point at each other, the orientation of one or both devices must be adjusted to within a tolerable range of co-linearity. A portable application, on the other hand, may include a hand held device that is presented to a kiosk for a download or upload operation. In this example, one part of the connection may be fixed in location with one or more ports that can be accessed by the hand held device in an opportunity fashion. If the hand held device and the kiosk are in line, they are partners and if they are not sufficiently co-linear then one or both beams may be steered to compensate, including to compensate for the instability inherent in human operation of the hand held device.

Active, automatic discovery and setup is a difficult and problematic approach to device setup and discovery operations. Using only in-band emission and reception for detection and avoidance/mitigation of interference is problematic. Emitting in-band energy during the discovery process can be problematic as this might have the unintended effect of disturbing other co-located devices in the band space. The need to "sweep" an angle larger than that of the native capabilities of either the transmitter or the receiver in order to complete the alignment operation or to ascertain what other devices might be co-linear but "behind" a device is also a consideration.

Moreover, beam steering or multiple antennas might be used to sweep the surrounding area in an effort to "sniff out: in-band energy levels and to transmit active in-band beacons, but such activity is a drain on the in-band resources needed to transmit data payload. Adding extra hardware or control to simulate omni-directional capabilities comes at an additional cost and even carving out time slots from payload applications may not be acceptable. In light of the foregoing, it can be seen that so-called "active" approaches for device setup and discovery are not without problems.

Figure 3:
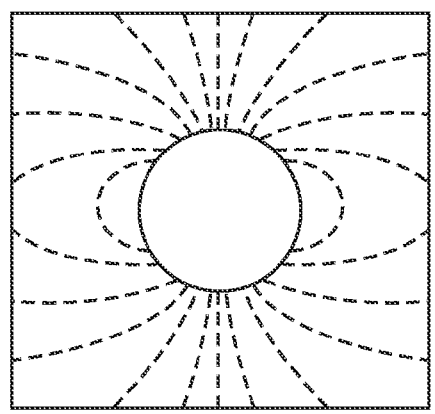
FIG. 3 illustrates the magnetic flux lines of the Earth.
Figure 4A:
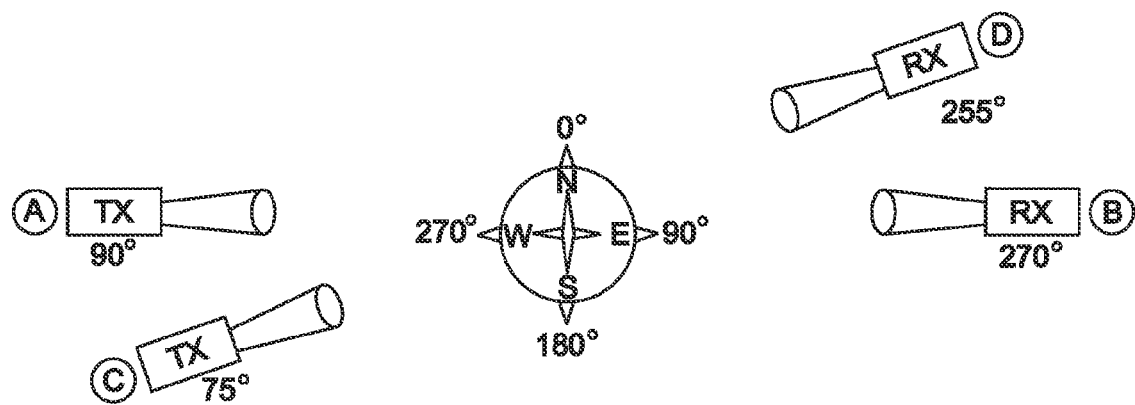
FIGS. 4A and 4B illustrate compass angle orientation.
Figure 4B:

In accordance with embodiments of the present invention, the use of multi-axis electronic compasses provides a passive, automatic approach to discerning linearity between devices. Each device may determine its own orientation based upon a fixed reference (each device may or may not share the same fixed reference in the environment); receivers would have an angle of incidence and transmitters would have an angle of influence. This is especially attractive since this determination can be made passively without disturbing the environment, in sharp contrast to the active approach discussed previously. Electronic compasses detect the earth's magnetic field and use that to determine a device's orientation with respect to a fixed reference point. Please refer to FIG. 3 in which the flux lines of Earth's magnetic field are illustrated. An objective measure of the compass angle between two devices permits a ready determination of whether these two devices are sufficiently aligned and therefore co-linear so as to support wireless communications between them. A measurement of 180° of difference between the two devices indicates that the two devices are "looking" at each other, perfectly co-linear and thus able to support wireless communications between them. It may also indicate that the devices are looking away from each other, e.g. back-to-back. Referring to FIG. 4A, an example of compass angle orientation is shown. In this example, it can be seen that transmitter A is 180° from receiver B, facilitating a connection sufficient to support wireless communications between A and B. Devices C and ED are also 180° apart and can also complete their own independent connection without interfering with devices A and B, being 15° apart from the orientation of the A and B device pairing. Moreover, as illustrated in FIG. 4B, tilt angle can be determined through use of an additional sensor. Such a sensor provides orientation information to the control subsystem of the device, described below.

It is noted that two devices need not be perfectly aligned in order to support wireless communications; rather, they need to be substantially aligned to the extent sufficient to support wireless communications. The degree of co-linearity that is sufficient may be influenced by a number of factors, including how wide the antenna is and the range of the antenna of a particular device and its neighbors. 60 GHz MMWC technology is a highly directional beam but may be spread for a wider angle of dispersion (lower energy) as needed. For example, a 30° beam may have an acceptable degree of co-linearity of +/−15°, while a 2° beam would have an acceptable limit for co-linearity of +/−1°. Again, receivers would have an angle of incidence and transmitters would have an angle of influence; this provides a plus/minus tolerance for the orientation of devices. The control logic embodied in the control subsystem of a device may dictate practice co-linearity.

The use of multi-axis electronic compass technology provides for passive setup and discovery of other co-linear devices without affecting normal operation of a device. It is envisioned that since radios commonly have multiple channels, such as four channels, an omni-directional, low data rate control, "out-of-band" channel can be used for sharing information between devices. Such an "out-of-band channel" may be 2.4 GHz or 900 MHz, for instance. Communication between devices to determine relative compass orientations may also be carried out passively in a background channel.

Figure 5:
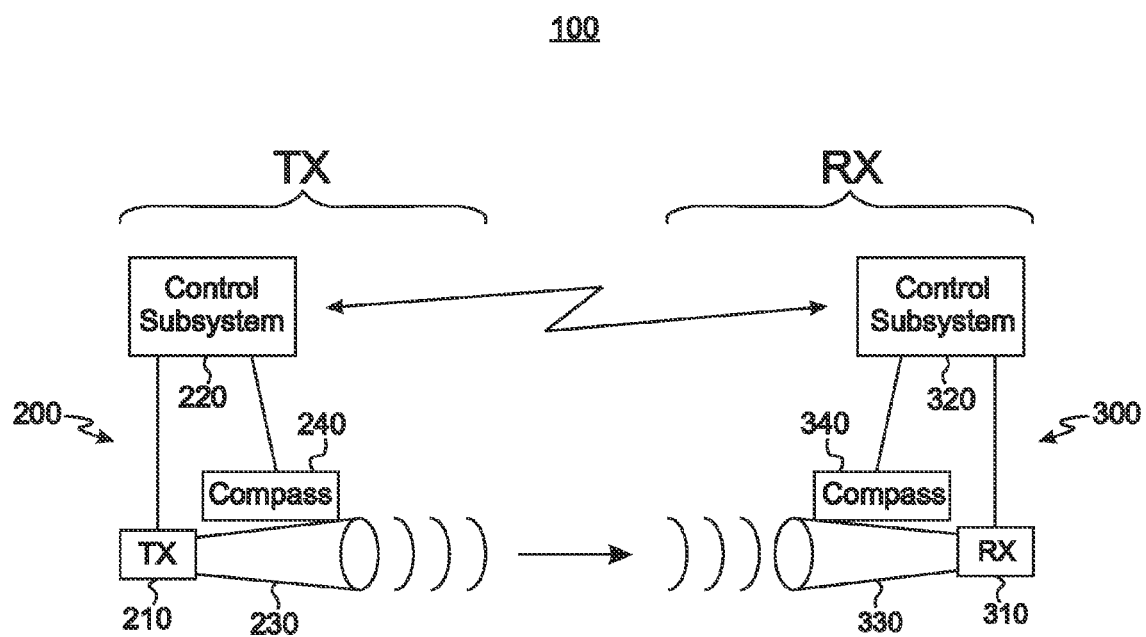
FIG. 5 is a block diagram of an exemplary system capable of using compass orientation information in a wireless environment, in accordance with certain embodiments.

Referring to FIG. 5, an exemplary system diagram in which a MMWC system 100 using compass sensors is illustrated. As can be seen in the potential pairing between a transmitter side 200 and a receiver side 300, with a transmit element or source device 210 and a receiver device 310, each having a control subsystem 220 and 320, respectively. Transmitter side 200 further has a compass element 240, while receiver 300 has compass element 340 as shown. Productive use of the 60 GHz technology of MMWC system 100 is gleaned from the highly directional transmission of information, as in the payload data being beamed from the transmit element 210 to the receive element 310. A compass element 240, 340 is coupled in cooperative arrangement with to its respective antenna 230, 330. The directional compass orientation of the device, determined by the compass element is utilized by the respective control subsystem to determine whether the devices 200, 300 are sufficient co-linear to support wireless communications between them.

Figure 6:
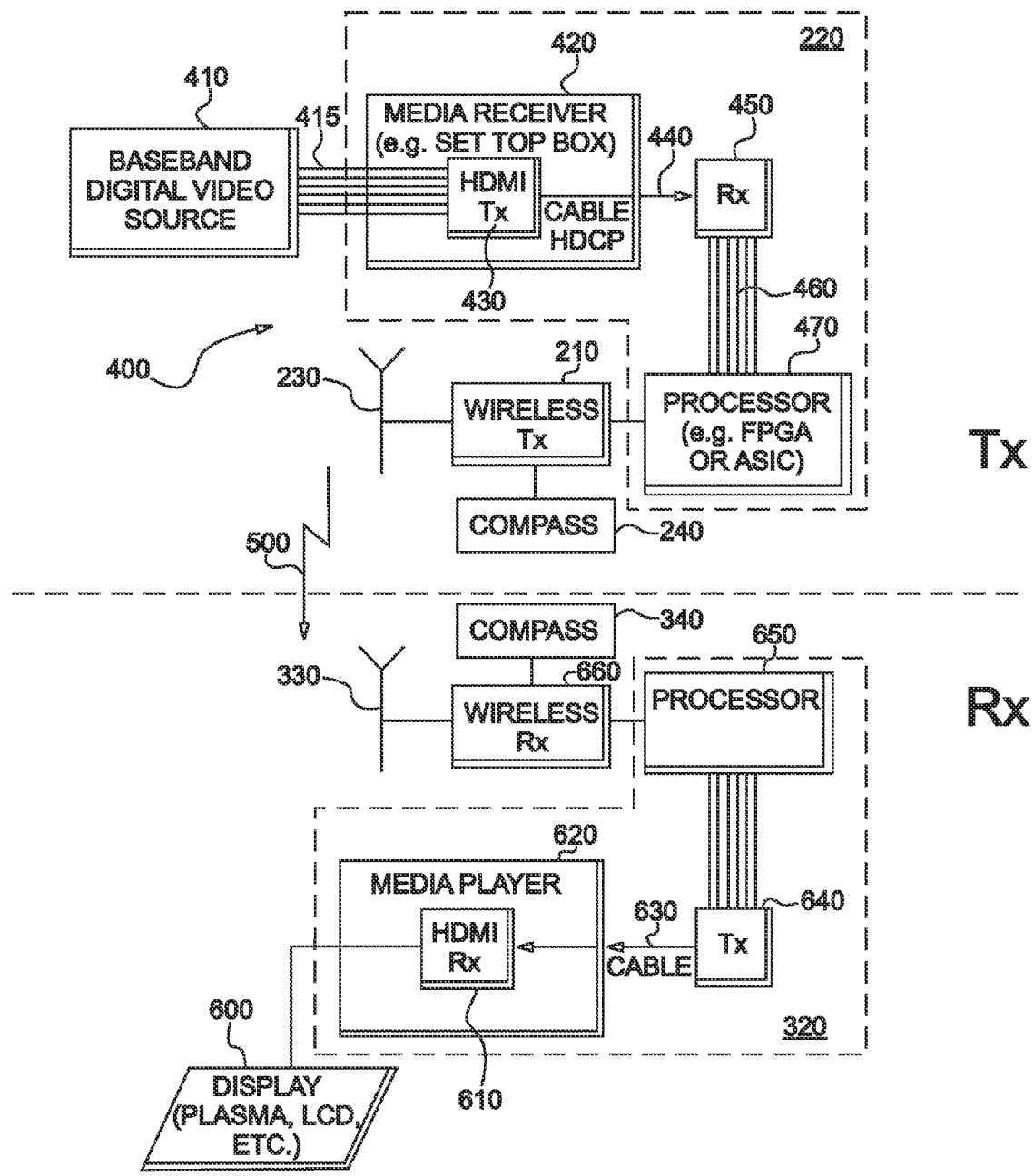
FIG. 6 is a schematic diagram of an exemplary system capable of using compass orientation information in a wireless environment, in accordance with certain embodiments.

Referring now to FIG. 6, an exemplary system supportive of MMWC technology is shown for purposes of illustration, consistent with embodiments of the present invention. System 400 includes a source 410 of baseband multimedia data, and in particular high definition (HD) digital video with audio. The source 410 may be a laptop computer or other multimedia computer or server. Or, it can be a satellite, broadcast, or cable receiver, or it can be a DVD player or other multimedia source. It is noted that the particulars of an exemplary embodiment of control subsystems 220, 320 FIG. 5 are illustrated and are not meant to abridge or otherwise limit the variations in embodiments envisioned by the present invention.

The source 410 sends multiplexed multimedia data over lines 415 to a media receiver 420, so that the source 410 and media receiver 420 together may be thought of as a "source" of data and specifically of HDMI data. The media receiver 420 may be a set-top box that can include a High Definition Multimedia Interface (HDMI) transmitter 430, such as a 60 GHz transmitter. The HDMI transmitter 430 employs HDMI protocols to process the multimedia data by, among other things, encrypting the data using High-Bandwidth Digital Content Protection (HDCP) and supporting TV resolutions such as 16.times.9 display ratios to the multimedia data.

In accordance with HDMI principles known in the art, the HDMI transmitter 430 sends HDCP-encrypted multimedia data over a cable or other wire 440 to a receiver 450, such as a Digital Visual Interface (DVI) receiver. According to the present invention, the receiver 450 uses protocols, such as DVI protocols, to process the received data. As part of the processing the HDMI transmitter 430 multiplexes the video and multiplexes the audio within the video data stream. The receiver 450 demultiplexes the video while passing through the audio multiplexed within the data stream. In any case, at no time need the receiver 450 decrypt or re-encrypt the stream.

The encrypted multimedia data from the VBI receiver 450 is sent to a processor 470, such as an application specific integrated circuit (ASIC) or field programmable gate array (FPGA) or other microprocessor. The processor 470 processes the data for wireless transmission by a wireless transmitter 210 over a transmitting antenna 230. The processor 470 is described further below.

The encrypted multimedia data is wirelessly transmitted over a wireless link 500 to a receiver antenna 330, which sends the data to a wireless receiver 660. Multimedia may be transmitted in an uncompressed form on the link 500 such that so much data is transmitted each second that bootlegging the content is essentially untenable, although some data compression less preferably may be implemented. The data may also be transmitted in compressed form if desired. The transmitter 210 and receiver 660 (and, hence, link 500) may operate at a fixed (unvarying, single-only) frequency of approximately sixty GigaHertz (60 GHz), and more specifically may operate in the range of 59 GHz 64 GHz, and the link 500 may have a data rate, which may be fixed, of at least two Giga bits per second (2.0 Gbps). When DQPSK is used the data rate may be 2.2 Gbps, and the link may have a data rate of approximately 2.5 Gbps. The link may have a fixed bandwidth of two and half GigaHertz (2.5 GHz).

With this in mind, it may now be appreciated that the wireless transmitter 210 may include an encoder for encoding in accordance with principles known in the art. The encoded data is modulated and upconverted by an upconverter for transmission over the link 500 at about 60 GHz (i.e., in the 60 GHz band). Using the above-described wide channel and a simpler modulation scheme such as but not limited to DQPSK, QPSK, BPSK or 8-PSK, a high data rate yet simple system can be achieved. For example, when DQPSK is used, a data rate of twice the symbol rate can be achieved. For 8-PSK a data rate of 3.3 Gbps may be achieved.

It may further be appreciated that the wireless receiver 660 includes circuitry that is complementary to the wireless transmitter 210, namely, a downconverter, a demodulator, and a decoder. In any case, the data from the wireless receiver 660 is sent to a processor 650 for error correction and re-multiplexing as appropriate for use by a transmitter, such as a DVI transmitter, 640. The processor 650 can also demultiplex any control signals for the display from within the video data as might be necessary. The transmitter 640 operates in accordance with principles known in the art to process the encrypted multimedia without ever decrypting it, and to send the multimedia data over a cable or other wire 630 to a HDMI receiver 610 that may be part of a media player 620, such as a DVD player or TV or other player. The HDMI receiver 610 decrypts the multimedia data in accordance with HDCP principles and demultiplexes the audio data from the video data. The multimedia content may then be displayed on a data sink, such as a display 600, such as a cathode ray tube (CRT), liquid crystal display (LCD), plasma display panel (PDP), or TFT, or projector with screen, etc. Together, the media player 620 and display 600 may be thought of as a video display, an HDMI sink, or other unit.

The link described above may be bi-directional, and return channel information that is necessary for, e.g., HDCP decryption purposes may be sent on a return link in the 60 GHz band or it may be sent on a return link "out of band."

The receiver 450, processor 470, and wireless transmitter 210 may be contained on a single chip, a chipset or on separate substrates. Indeed, the receiver 450, processor 470, and wireless transmitter 210 may be integrated into the media receiver 420. Likewise, the wireless receiver 660, processor 650, and transmitter 640 may be implemented on a single chip and may be integrated into the media player 620 if desired. In any case, the media receiver 420 and media player 620 and respective components may be co-located in the same space, owing to the 60 GHz wireless transmission frequency, in this embodiment, which cannot easily penetrate walls.

As has been discussed, determining whether one or more devices are in a co-linear or sufficiently co-linear relationship is important to identify a potential communication partner(s) and form substantially co-linear pairings during the setup portion of operation of a device and to further discern potential for interference between one or more devices, so that the interference might be mitigated to an acceptable level or even eliminated. Generally, if devices do not have the same orientation, then they are not co-linear and thus cannot interfere with transmission of signals. If, however, devices have substantially the same orientation, as determined by their respective orientations then the opportunity for an advantageous device pairing, as well as for unwanted interference between signals of non-paired devices, exists.

Figure 7:
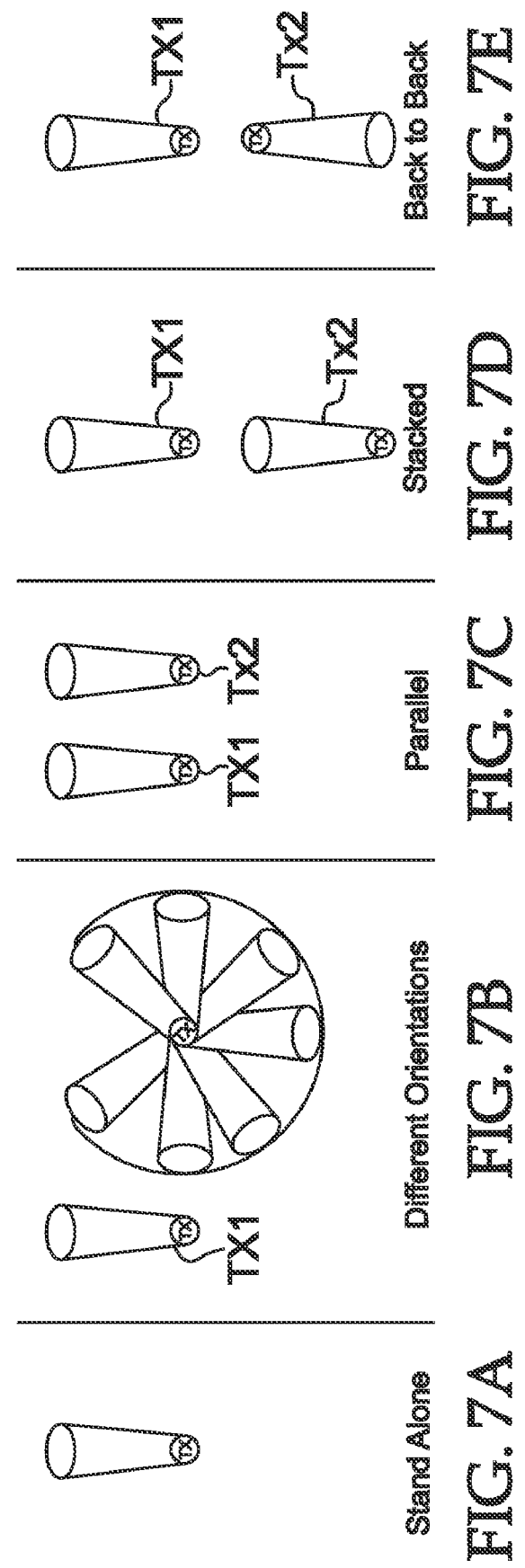
FIGS. 7A to 7E illustrate different transmitter device orientations.

Referring now to FIGS. 7A-7E examples of different transmitter device orientations, i.e. ways in which a transmitter may share space with other transmitters, are illustrated. In FIG. 7A, the transmitter device is in a stand alone situation in which there is not another transmitter sharing the same space; there is no co-located transmitter. The potential for conflict or contention, such as signal interference, is not present. In FIG. 7B, other transmitters are co-located with the transmitter on the left TX1, but have a different orientation than TX1, don't share the same line of communication, and thus cannot be a source of interference to a signal transmitted by TX1 or suffer interference in their signals that might otherwise be caused by the transmitter TX1. This orientation of TX1 with respect to the other transmitters makes for an efficient first discriminator. Two transmitters TX1 and TX2 arranged in parallel, such as shown in FIG. 7C, may share the same orientation but, being parallel and not too close in proximity, coexist happily without interference between their respective signals. In FIG. 7D, the example of two "stacked" transmitters TX1 and TX2 is problematic. It can be appreciated that such an arrangement, in which the energy from TX2 overlaps that of TX1 in front of it, presents the perfect recipe for interference problems, assuming that the two devices are within communication range of each other. FIG. 7E illustrates the case in which the transmitters TX1 and TX2 are co-linear but because they are 180° out of phase, they are in effect "back-to-back" and therefore interference between their signals is not a concern.

Figure 8:
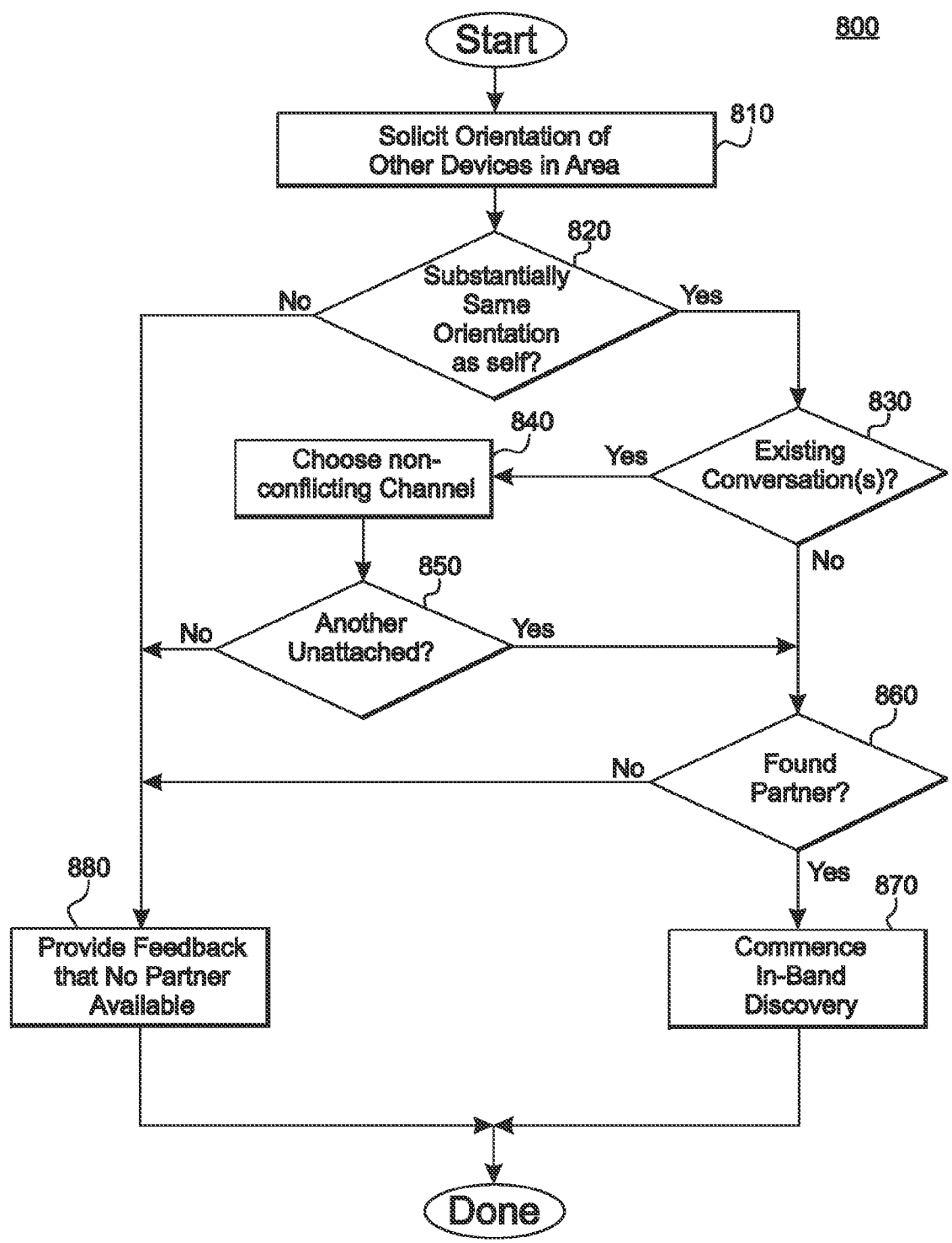
FIG. 8 is a flow chart illustrative of new device introduction and setup in accordance with certain embodiments.

Referring to FIG. 8, a flow chart 800 illustrates how compass data can be used in the introduction of a new device in a wireless space or environment. This flow applies to devices which are in the setup phase of operation, in other words, looking for other devices that might be good candidate with which to form a substantially co-linear pairing, as well as a purely discovery phase of operation, in which issues of potential interference must be ferreted out. An omni-directional low data rate, i.e. 2.4 GHz, 900 MHz, etc., may be assumed for control channel for sharing information between devices.

AT Block 810, the control subsystem of a device solicits orientation information of other co-located devices located in the area and within communication range. At Decision Block 820, the orientations received by the device's receive element from other devices in the area are examination by the device's control subsystem to determine whether any of the received orientations are substantially the same as the device's own orientation. If not, then feedback may be provided back to the system or a human operator or a controller, in the form of a generated message or otherwise, that no potential partner is currently available for the device. Of course, the process may be repeated periodically as it is recognized that a new device might become available as a suitable partner for the existing partner if the new device newly joins the space or if a device physically located but previously not turned on, is made operational. Each device coming "awake" in a space could check to see what other device is sharing the space—a potential partner, a potential competitor (e.g. if both devices are transmitters), a pre-existing pairing, etc. If no other device of interest is detected, the unpaired device could go into a sleep or standby mode until another co-located device becomes active. It is envisioned that the control subsystem of a respective device would help determine if other devices are even looking for a mate or are simply new units simply intruding into the space. A device already engaged in a "conversation" with another device would let that fact be known by transmitting the appropriate information via its transmitter element, and it might be assumed that any devices other than its co-linear partner is a potential intruder. Human interaction with one or more devices in the space may be used to help make such determinations if needed.

If, on the other hand, it is determined that there are one or more orientations of other devices in the area having substantially similar orientations are the device making the inquiry, then the flow continues to Decision Block 830. If the receive element of the device detects the presence of existing conversations in the environment, then the flow continues to Block 840, where a non-conflicting channel might be chosen for the device by the control subsystem of the device. The inquiry then, at Decision Block 850, is whether there is another device that does not have a partner, and is thus available to form a co-linear pairing. If yes, then the control subsystem of the device will need to ascertain that the newly identified potential partner is available to form a substantially co-linear pairing at Decision Block 860. If yes, then in-band discovery by the device may commence at Block 870.

Referring back to Decision Block 830, if there were found to be no existing conversations by the other devices identified at Decision Block 820 as having substantially the same orientation as the device, then those identified devices having the same or substantially the same orientations may be good candidates to form a pairing with the device. At Decision Block 860, the inquiry is whether a partner has been found. If yes, then in-band discovery commences at Block 870. If no, then the flow goes to Block 880, discussed above.

Figure 9:
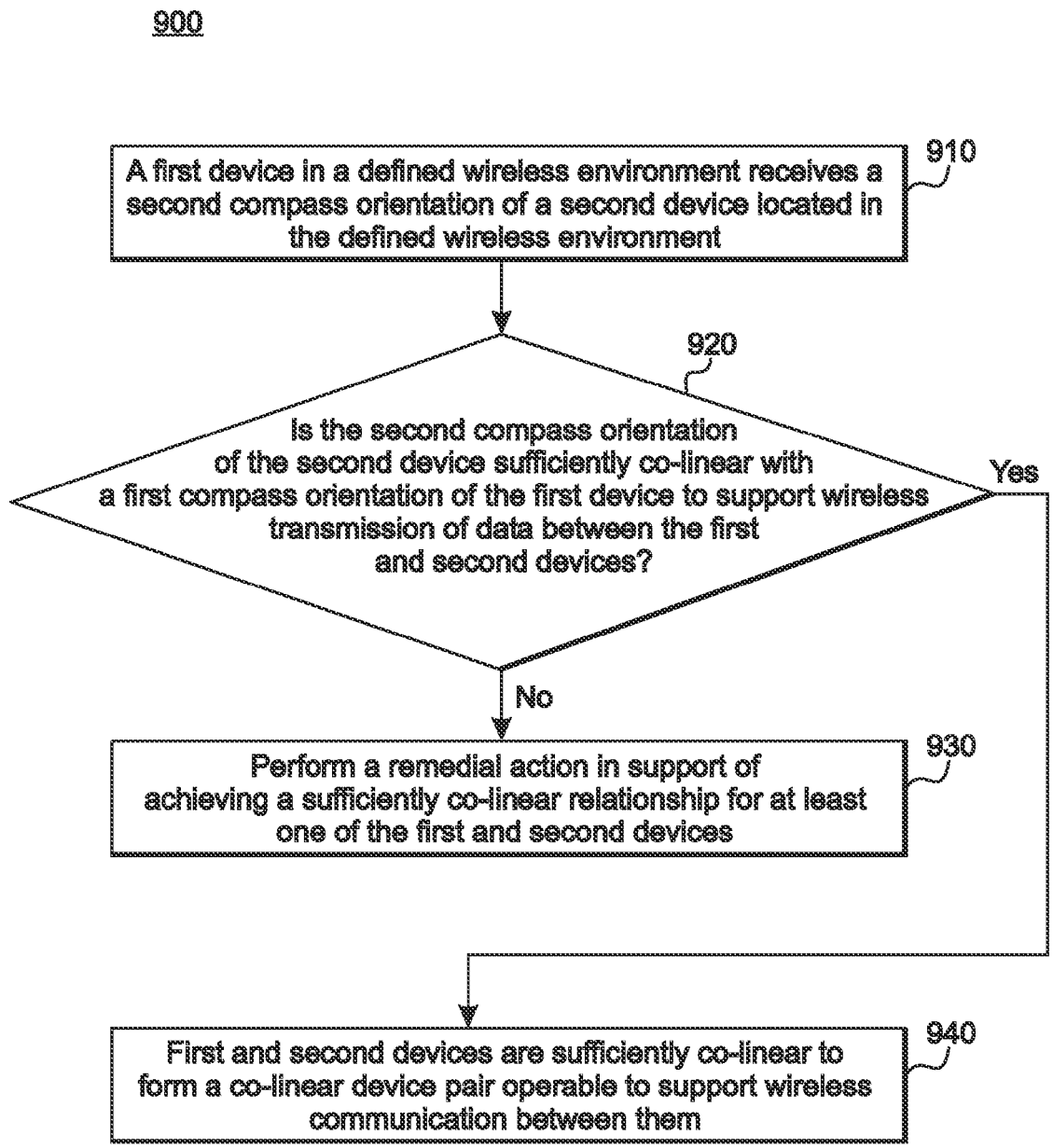
FIG. 9 is a flow chart that illustrates determination of whether two wireless devices are good candidates to form a substantially co-linear device pair in accordance with certain embodiments.

There are envisioned further embodiments of forming co-linear relationships between devices in a defined environment and mitigating potential or actual interference between devices. Referring now to FIG. 9, a flowchart illustrates an approach that might be taken in an effort to form a substantially co-linear wireless device pair in a defined wireless environment. At Block 910, a first device in the defined environment receives a second compass orientation of a second device located in the defined environment. As previously discussed, a receive element of the first device is operable to receive the second compass orientation of the second device. Next, at Decision Block 920, an inquiry is made as to whether the second compass orientation of the second device is sufficiently co-linear with a first compass orientation of the first device to support wireless transmission of data between the first and second devices. This determination is made by the control subsystem of the first device upon receipt of the second compass orientation of the second device. Again, the comparison of the first and second compass orientations and a determination of the degree of co-linearity required is a function of a variety of factors, but the devices are to be sufficiently co-linear to support wireless communications between them. If the second compass orientation of the second device is not sufficiently co-linear with the first compass orientation of the first device, a remedial action may be performed in support of achieving a sufficiently co-linear relationship for at least one of the first and second devices. Also, if the second compass orientation of the second device is not sufficiently co-linear with the first compass orientation of the first device, a decision may be made that the two devices are not suitable for pairing and a mitigation action may be performed to mitigate potential or actual interference between the devices.

An appropriate remedial or mitigation action may involve a variety of responses, including, for example:
  use of a different channel;
  if another channel is not available, checking to see if the device (receiver) is picking up any in-band energy from a pre-existing device (transmitter) and if so, the device avoiding that frequency;
  orienting either device towards another, third device that might be a better candidate with which to form a substantially co-linear pair capable of wireless communications;
  a new transmitter device may emit a short burst in coordination with other devices with the same orientation and channel in order to minimize adverse effects in the environment; if interference is detected by any of the pre-existing receivers, then the stacked case has been identified and would be resolved by using a new channel;
  addressing a co-linear problem that cannot be addressed by use of a different channel by repositioning one or more of the first and second devices;
  transmitting a message to other devices within range that one or both of the first and second devices are available for forming part of a co-linear pair, etc.

If the second compass orientation is sufficiently co-linear with the first compass orientation of the first device, this indicates that the first and second devices are sufficiently co-linear to form a co-linear device pair operable to support wireless communications, as at Block 940.

It is appreciated that initial positioning and gross alignment of devices can be performed, such as by a human operator or robotic controller, and then checked to see if two devices are sufficiently co-linear to support wireless communication between them and what type of adjustments or remedial action might be made to improve co-linearity during a set-up phase designed to produce co-linear device pairings necessary to support wireless communications. During a discovery operation, positioning and alignment can be used to discover what other devices are co-located that might provide better options for establishing a co-linear relationship, and what, if any, potential interference problems might result from the initial positioning of the devices. A human operator or controller could then take one or more remedial actions, including to establish better pairings and to mitigate interference that might exist between two or more substantially co-linear signals. It is further noted that these actions or adjustments may be taken on behalf of a device at any time, including upon initial setup and discovery of other co-located devices, periodically, and upon a previously co-located but non-operational device becoming operational, i.e. "joining" the network of available devices in the environment space.

Figure 10:
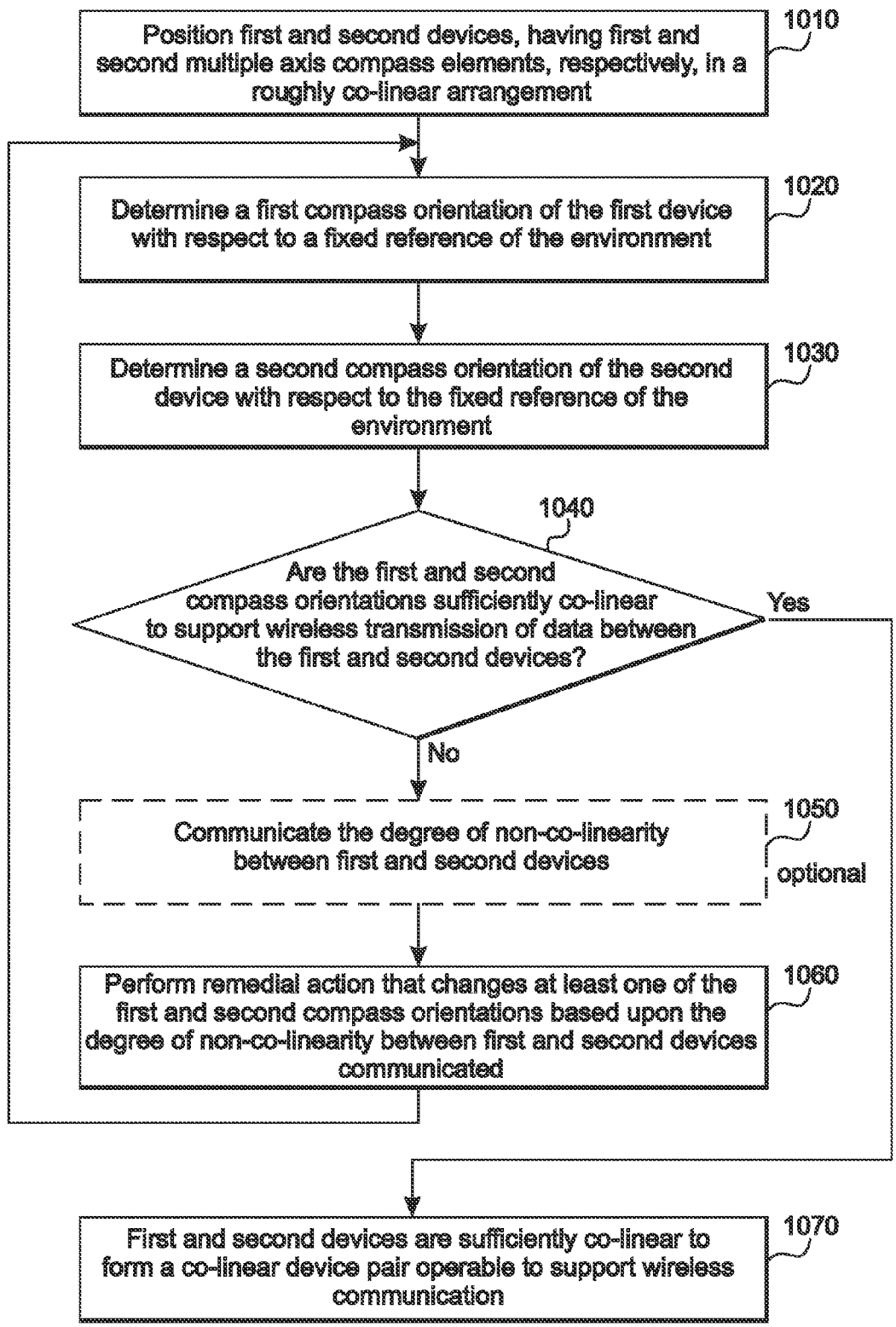
FIG. 10 is a flow chart that illustrates formation of a substantially co-linear device pair in accordance with certain embodiments.

In FIG. 10, a flow 1000 for forming a substantially co-linear wireless device pair in a defined communication environment is shown. A first device and a second device, having first and second multiple axis compass elements, respectively, are initially positioned to be in a roughly co-linear arrangement in the environment at Block 1010. A first compass orientation of the first device with respect to a fixed reference of the environment is determined at Block 1020; this may be performed by a first control subsystem of the first device interrogating the first compass element of the first device to determine the first compass orientation of the first device with respect to the fixed reference of the environment. Similarly, at Block 1030 a second compass orientation of the second device with respect to the fixed reference of the environment is determined at Block 1020; this may be performed by a second control subsystem of the second device interrogating the second compass element of the second device to determine the second compass orientation of the second device with respect to the fixed reference of the environment. At Decision Block 1040, the inquiry is whether the first and second devices are sufficiently co-linear to support wireless transmission of data between the first and second devices; this is determined from the first and second compass orientations. This determination may be performed by the control subsystem of either the first or second devices, but it is envisioned that the control subsystem of the device initiating the flow of FIG. 10 would make this determination. If the first and second compass orientations are not sufficiently co-linear to support wireless communications between the devices, then the degree of non-linearity may be optionally communicated at Block 1050; the message may be communicated to an entity other than the first and second devices, such as to a controller or human operator capable of taking corrective action in response to this information.

Again, either device may perform this function, though it is envisioned that the device initiating the process, and thus managing the effort, will handle the communication as it is the control subsystem assigned to this device that will be making the determination.

At Block 1060, a remedial may be performed to change at least one of the first and second compass orientations, in response to the degree of non-co-linearity between the first and second devices communicated in Block 1050, if this optional action was taken. If Block 1050 was not performed, then the remedial action may still be made to increase chances for forming a co-linear pair between first and second devices or in support of allowing either or both of the devices to form a co-linear pair with other, third party devices in the environment. For instance, the remedial action may be changing the first compass orientation of the first device in support of achieving a sufficiently co-linear relationship between the first device and a third device in the environment. Or, the remedial action may be adjusting a position of least one of the first and second devices to achieve a greater degree of co-linearity between the first and second devices.

If it is determined at Decision Block 1040 that the first and second compass orientations are sufficiently co-linear to support wireless communications between them, then the first and second devices are sufficiently co-linear to form a co-linear device pair operable to support wireless communications between them.

Figure 11:
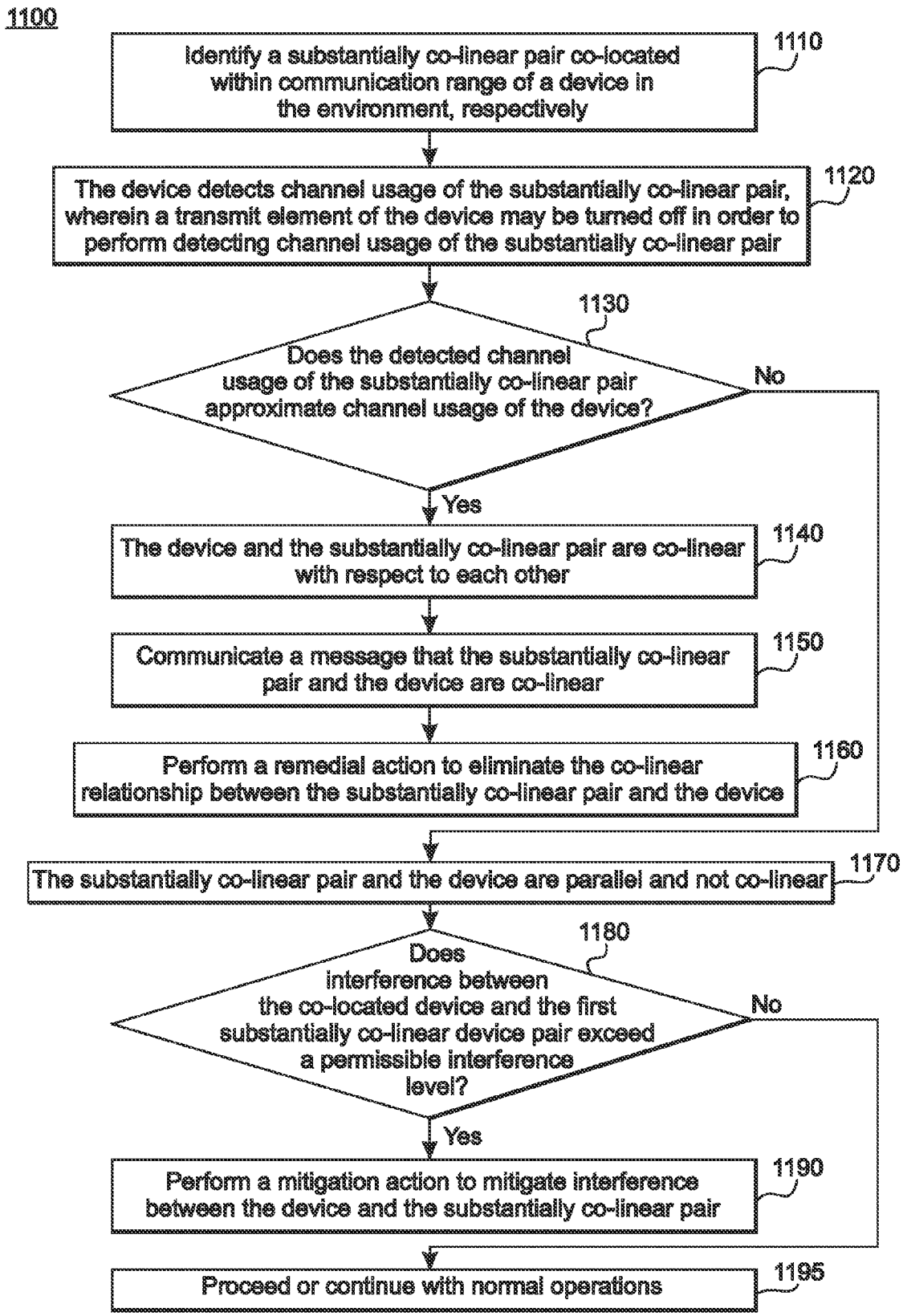
FIG. 11 is a flow chart that illustrates formation of a substantially co-linear device pair and mitigation of identified interference conditions in accordance with certain embodiments

In addition to forming substantially co-linear pairings during the setup portion of operation of a device, it is also envisioned to discern potential for interference between one or more devices, so that the interference might be mitigated to an acceptable level or even eliminated. Referring now to FIG. 11, flow 1100 provides for determining whether a device is substantially co-linear with a substantially co-linear pair in the environment. Generally speaking, it is problematic for a device to be co-linear with an existing co-linear pair, as that indicates the possibility and indeed likelihood of interference issues during transmission activities. This flow may be performed after forming a substantially co-linear device pair, discussed in FIGS. 9 and 10, or it may be at any desired time, such as upon a device joining the environment or upon becoming active in the environment, as might occur upon a device being powered up.

Identification of co-location of a device with a co-linear device pair can pinpoint interference problem spots in the environment, from the perspective of the device or the co-linear device pair. At Block 1110, for a given device in the wireless environment, a substantially co-linear device pair co-located with the device in the environment can be identified. Such a co-linear device pair will be within communication range of the device and the control subsystem of the device will be operable to use first and second compass orientations of the pair devices received by the receive element of the device. At Block 1120, the device detects channel usage of the substantially co-linear pair and a transmit element of the device may be turned off in order to perform the channel usage detection. At Decision Block 1130, the inquiry is whether the detected channel usage of the substantially co-linear pair approximates that of the device. If yes, this indicates that the device and the substantially co-linear pair are co-linear with respect to each other, at Block 1140. A message may be communicated at Block 1150 of this, and at Block 1160, a remedial action may be undertaken to eliminate the co-linear relationship between the substantially co-linear pair and the device. This may include moving the device out of range of the co-linear pair or vice-versa, changing the orientation of the device to break the co-linearity it has with the co-linear pair, or changing operation of the device to a different channel.

If, conversely, the channel usage of the substantially co-linear pair and that of the device do not approximate one another, then the flow continues from Decision Block 1130 to Block 1170 where it is shown that this is indicative of the substantially co-linear pair and the device being parallel, and not co-linear. It is possible to still have interference problems between a device and a co-linear pair which are parallel with respect to one another and in close enough proximity to yield signal interference, and so the inquiry at Decision Block 1180 is whether any interference detected between the device and the co-linear device pair exceeds a permissible level. If no, then any interference, if present, need not be addressed as it does not exceed a permissible interference level and normal device operation may proceed or continue, Block 1195. If yes, that a mitigation action may be performed at Block 1190 to mitigate (or possibly even eliminate) interference between the device and the substantially co-linear device pair.

Figure 12:
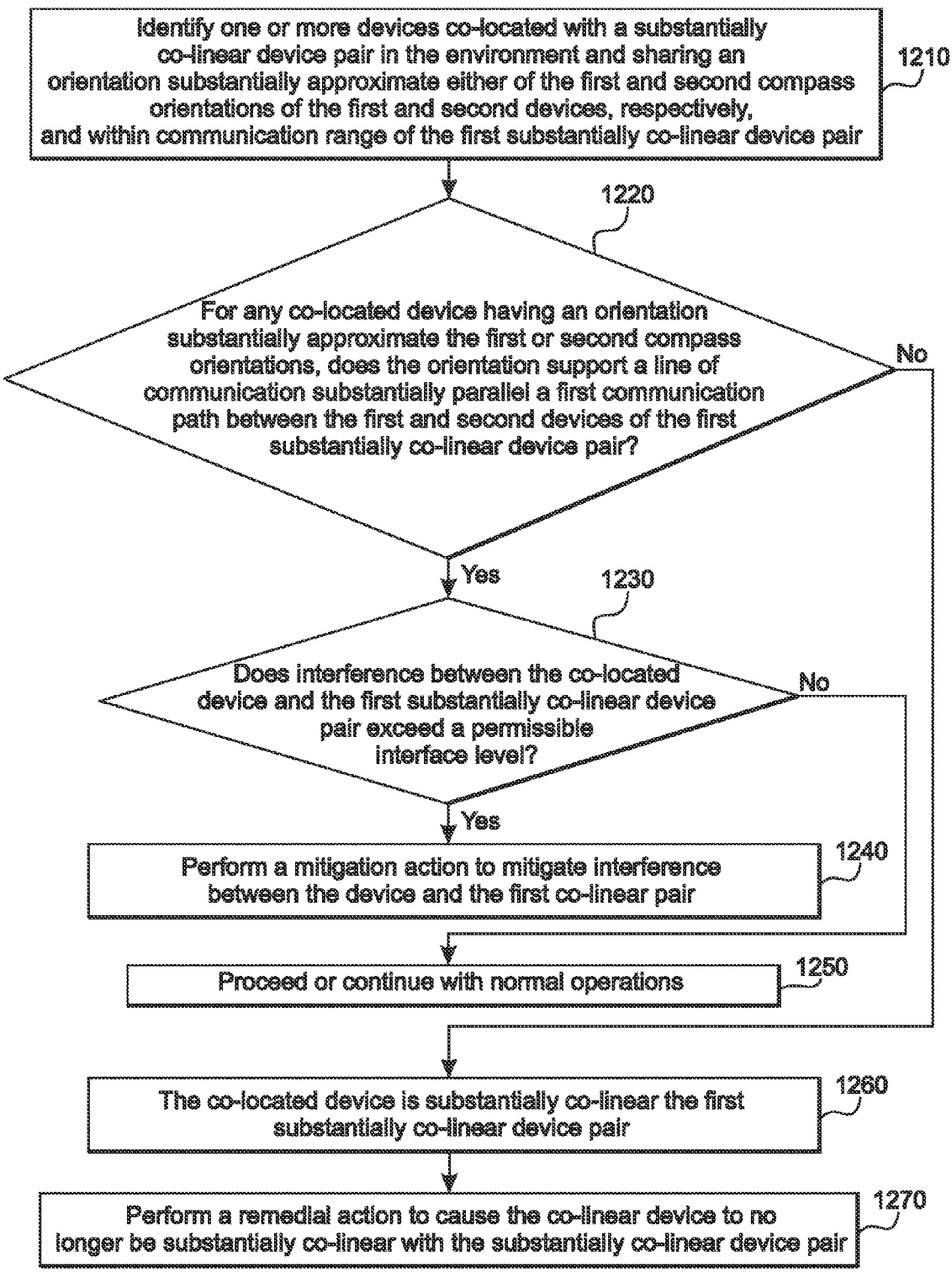
FIG. 12 is a flow chart that illustrates identification of parallel devices and mitigation of interference conditions in accordance with certain embodiments

It is noted that a similar endeavor may be undertaken from the perspective of the substantially co-linear device pair. From this perspective, one or more devices co-located with the substantially co-linear device pair in the environment sharing an orientation substantially approximate either of the first and second compass orientations of the first and second devices, respectively, and within communication range of the first substantially co-linear device pair may be identified and the compass orientation of the device known to a control subsystem of one of the devices of the co-linear pair, as in Block 1210 of flow 1200 of FIG. 12. Then, for any co-located device of the one or more co-located devices having an orientation substantially approximate the first or second compass orientations, an inquiry is made as to whether the co-located device's orientation supports a line of communication substantially parallel a first communication path between the first and second devices of the first substantially co-linear device pair at Decision Block 1220.

If, it is determined that a device of the one or more co-located devices has an orientation substantially approximate either the first and second compass orientations and capable of supporting a line of communication that is substantially parallel a communication path between the first and second devices of the first substantially co-linear pair, then, as described above, the inquiry would be whether device is proximate enough to the communication path between the devices of the pair to cause a permissible interference level between the substantially co-linear device pair and the device to be exceeded at Decision Block 1230. If yes, then a mitigation action may be performed at Block 1240 to mitigate interference between the device and the first substantially co-linear pair. If, there is no interference or if the interference does not exceed a permissible interference level than normal operation of the device pair and the device may begin or continue at Block 1250.

If a co-located device has an orientation that does not support a line of communication substantially parallel that of the first communication path between the first substantially co-linear pair, the indication is that the co-located device is substantially co-linear the first substantially co-linear device pair, at Block 1260. This would support a presumption that the substantially co-linear device pair and the identified co-located but not parallel device are impermissibly co-linear. Then, for an identified co-linear device, at Block 1270 a remedial action to cause the co-linear device to no longer be co-linear with the substantially co-linear device pair may be performed. The remedial action to cause the co-linear device to no longer be co-linear with the substantially co-linear device pair may include one or more of the following actions: changing the first or second compass orientations of the first and second devices to define a new communication path between the first and second devices that is substantially co-linear to support wireless communications between the first device pair, changing the orientation of an identified co-linear device to have a new orientation that is not substantially co-linear with either of the first and second compass orientations of the first and second devices, and communicating a message that the co-linear device and the substantially co-linear device pair are impermissibly co-linear.

Figure 13:
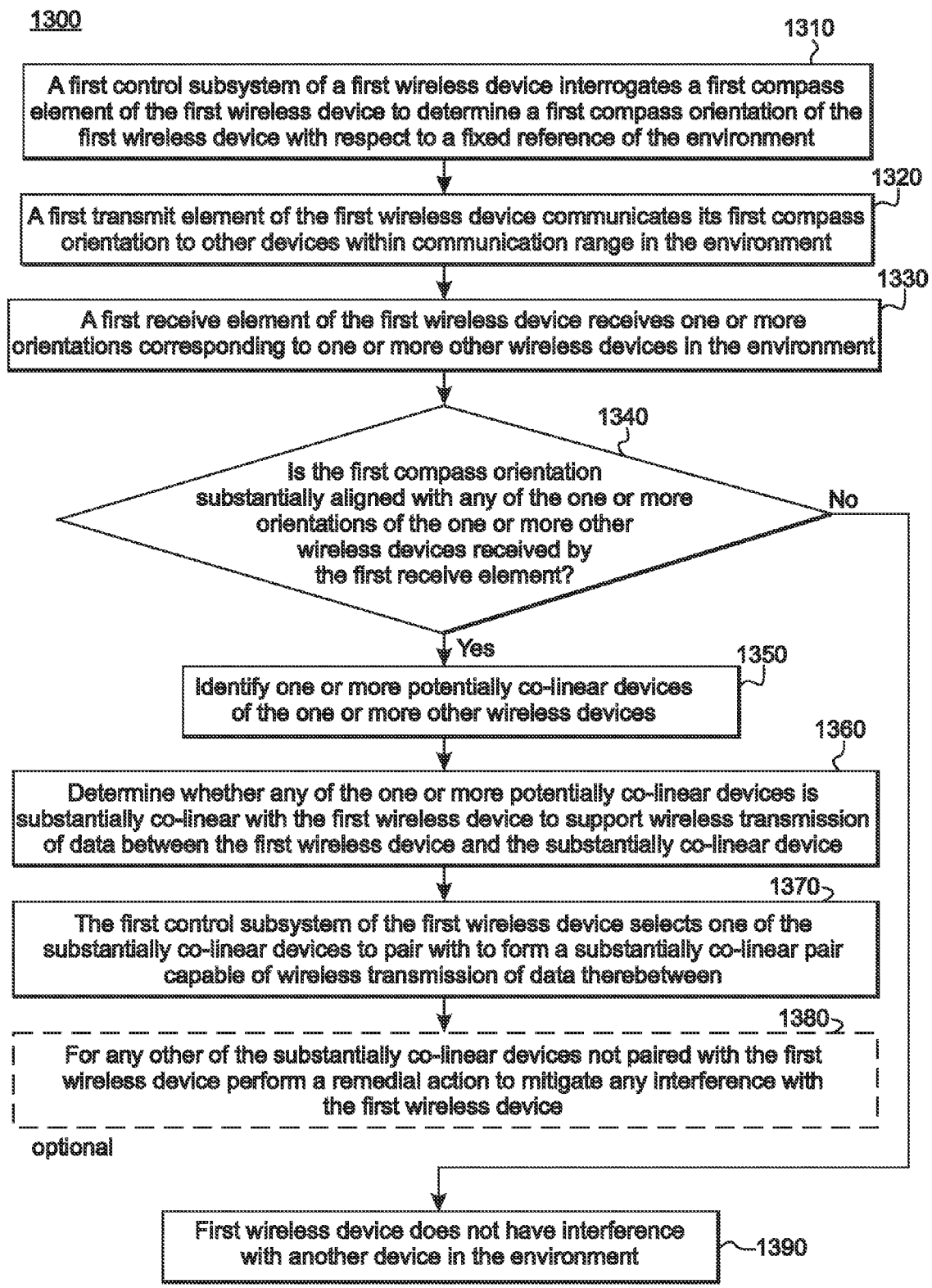
FIG. 13 is a flow chart that illustrates for random devices of a wireless environment formation of device pairs and interference mitigation in accordance with certain embodiments.

Mitigation of interference that might occur between random devices in the environment, as distinguished from interference between a co-linear pair and a device, is illustrated in FIG. 13. Such a flow 1300 might be undertaken upon a device joining an existing wireless communication environment or periodically thereafter. The device or devices may or may not be paired in a co-linear relationship with another device. At Block 1310, a first control subsystem of a first wireless device interrogates a first compass element of the first wireless device to determine a first compass orientation of the first wireless device with respect to a fixed reference of the environment. At 1320, a first transmit element of the first wireless device communicates its first compass orientation to other devices within communication range in the environment. A first receive element of the first wireless device receives one or more orientations corresponding to one or more other wireless devices in the environment at Block 1330. At Decision Block 1340, the inquiry is whether the first compass orientation is substantially aligned with any of the one or more orientations of the one or more other wireless devices received by the first receive element to identify one or more potentially co-linear devices of the one or more other wireless devices. If no, then the first wireless device does not have an interference problem with another device in the environment, at least currently, as shown at Block 1390. It is understood, that the first device may later develop an interference problem if it changes orientation or if another device substantially co-linear with the device becomes active in the environment.

If yes, then the flow continues to Block 1350 where one or more potentially co-linear devices of the one or more wireless devices are identified. For a potentially co-linear device identified, the first receive element of the first wireless device may detect channel usage of the potentially co-linear device and the control subsystem of the first wireless device can determine whether the channel usage of the potentially co-linear device is approximate the channel usage of the first wireless device. If the channel usage of the potentially co-linear device is not approximate the channel usage of the first wireless device, this indicates that the potentially co-linear device is not co-linear to the first wireless device and that the first wireless device is parallel and collocated with respect to the potentially co-linear device. Upon detection of interference between data transmission by the first wireless device along a first communication path and data transmission by the potentially co-linear device, a remedial action may be performed to mitigate interference between the potentially co-linear device and the wireless device. If, however, the channel usage of the potentially co-linear device is approximate the channel usage of the first wireless device, temporal alignment of data transmission along a first communication path by the first wireless device and along a second communication path by the potentially co-linear device may result in interference between the first and second communication paths. A remedial action may be performed to mitigate interference between the first and second communication paths during periods of temporally aligned wireless data communication.

Of those devices so identified, then next at Block 1360 it is determined whether any of the one or more potentially co-linear devices is substantially co-linear with the first wireless device so as to support wireless transmission of data between the first wireless device and the substantially co-linear device. The first control subsystem of the first wireless device can then select one of the substantially co-linear devices with which to form a substantially co-linear device pair at Block 1370. It is noted that for any other substantially co-linear devices not selected by the first wireless device to form a substantially linear device pair at Block 1370, a remedial action might need to be undertaken at Block 1380 to mitigate any interference between the first wireless device (now part of a substantially co-linear pair) and the non-selected co-linear device(s).

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of forming a co-linear relationship between wireless devices in a wireless communication environment, comprising:
   a first wireless device in the environment receiving a control band communication containing a second compass orientation of a second wireless device co-located in the defined environment;
   determining whether the second compass orientation of the second wireless device is sufficiently co-linear with a first compass orientation of the first wireless device to support wireless transmission of data between the first and second wireless devices;

if the second compass orientation of the second wireless device is not sufficiently co-linear with the first compass orientation of the first wireless device, performing a remedial action in support of achieving a sufficiently co-linear relationship for at least one of the first and second wireless devices in a co-linear pairing that permits wireless transmission of data in the co-linear pairing in a data band;

wherein the first wireless device receiving the second compass orientation of the second wireless device does not affect in-band operation of the first wireless device in the data band.

2. The method of claim 1, wherein the control band is out-of-band and the data band is in-band.

3. The method of claim 2, wherein the control band is an omni-directional back-channel.

4. The method of claim 1, wherein performing the remedial action achieves the co-linear pairing between the first and second wireless devices that permits wireless transmission of data between the first and second wireless devices in the data band.

5. A method of forming a substantially co-linear wireless device pair in a communication environment, comprising:

positioning a first device and a second wireless device to be in a roughly co-linear arrangement in the environment, wherein the first and second wireless devices have first and second multiple axis compass elements, respectively;

determining a first compass orientation of the first wireless device with respect to a first fixed reference of the environment;

determining a second compass orientation of the second wireless device with respect to the second fixed reference of the environment;

passively determining from the first and second compass orientations whether the first and second wireless devices are sufficiently co-linear to support wireless transmission of data between the first and second wireless devices, wherein the first and second compass orientations used to determine whether the first and second wireless devices are sufficiently co-linear are communicated in a control band communication; and if it is determined that the first and second wireless devices are not sufficiently co-linear to support wireless transmission of data between the first and second wireless devices, further comprising performing a remedial action in support of achieving a sufficiently co-linear relationship for at least one of the first and second wireless devices in a co-linear pairing that permits wireless transmission of data in the co-linear pairing in a data band, wherein the control band communication does not affect in-band operation of the at least one of the first and second wireless devices in the data band.

6. The method of claim 5, wherein if it is determined from the first and second compass orientations that the first and second wireless devices are not sufficiently co-linear to support wireless transmission of data between the first and second wireless devices, further comprising adjusting a position of least one of the first and second wireless devices to achieve a greater degree of co-linearity between first and second wireless devices.

7. The method of claim 5, wherein if it is determined from the first and second compass orientations that the first and second wireless devices are not sufficiently co-linear to support wireless transmission of data between the first and second wireless devices, the remedial action comprises changing the first compass orientation of the first wireless device in support of achieving a sufficiently co-linear relationship between the first wireless device and a third wireless device and the co-linear pairing of the first and third wireless devices in the environment.

8. The method of claim 5, wherein if it is determined from the first and second compass orientations that the first and second wireless devices are not sufficiently co-linear to support wireless transmission of data between the first and second wireless devices, further comprising communicating a message in the control band that quantifies the degree of non-co-linearity between the first and second wireless devices.

9. The method of claim 5, wherein if it is determined from the first and second compass orientations that the first and second wireless devices are sufficiently co-linear to form a substantially co-linear pair, further comprising determining whether the substantially co-linear pair of the first and second wireless devices is substantially co-linear with a wireless device in the environment, wherein determining whether the substantially co-linear pair is substantially co-linear with the wireless device does not affect in-band operation of the first and second wireless devices of the substantially co-linear pair and the wireless device.

10. The method of claim 9, further comprising:

identifying one or more wireless devices co-located with the substantially co-linear device pair in the environment sharing an orientation substantially approximate either of the first and second compass orientations of the first and second wireless devices, respectively, and within communication range of the first substantially co-linear device pair;

identifying any co-located wireless device of the one or more co-located wireless devices having an orientation substantially approximate the first or second compass orientations but not substantially parallel the first communication path as a co-linear wireless device, wherein the substantially co-linear device pair and each identified co-linear wireless device are impermissibly co-linear, wherein identifying does not affect in-band operation of any of the one or more co-located wireless devices; and for an identified co-linear wireless device, performing a remedial action to cause the co-linear wireless device to no longer be co-linear with the substantially co-linear device pair.

11. The method of claim 10, wherein performing the remedial action to cause the co-linear wireless device to no longer be co-linear with the substantially co-linear device pair further comprising performing one or more of changing the first or second compass orientations of the first and second wireless devices to define a new communication path between the first and second wireless devices that is substantially co-linear to support wireless communications between the first device pair, changing the orientation of an identified co-linear wireless device to have a new orientation that is not substantially co-linear with either of the first and second compass orientations of the first and second wireless devices, and communicating a message in the control band that the co-linear wireless device and the substantially co-linear device pair are impermissibly co-linear.

12. The method of claim 10, for a wireless device of the one or more co-located wireless devices identified as having an orientation substantially approximate either the first and second compass orientations, determining whether the orientation of the wireless device would support a line of communication that is substantially parallel a first communication path between the first and second wireless devices of the first substantially co-linear pair,
 wherein determining whether the orientation of the wireless device would support a line of communication that is substantially parallel a first communication path between the first and second wireless devices of the first substantially co-linear pair does not affect in-band operation of the wireless device and the first and second wireless devices.

13. The method of claim 12, wherein if the orientation of the wireless device is substantially parallel the first communication path, determining whether the wireless device substantially parallel the first communication path is proximate enough to the first communication path to cause interference between the wireless device and the first co-linear pair to exceed a permissible interference level and if interference between the wireless device and the first co-linear pair exceeds a permissible interference level, performing a mitigation action to mitigate the interference between the wireless device and the first co-linear pair.

14. The method of claim 10, wherein determining whether the substantially co-linear pair is impermissibly co-linear with another wireless device in the environment, further comprises:
 determining channel usage of the wireless device and channel usage of the substantially co-linear pair, wherein determining channel usage of the wireless device and channel usage of the substantially co-linear pair does not affect in-band operation of the wireless device and the substantially co-linear pair; and
 if the channel usage of the wireless device approximates channel usage of the substantially co-linear pair, then the wireless device and the substantially co-linear pair are co-linear with respect to each other.

15. The method of claim 14, further comprising performing a remedial action to mitigate the co-linear relationship between the substantially co-linear pair and the wireless device.

16. The method of claim 14, wherein if the detected channel usage of the wireless device does not approximate channel usage of the substantially co-linear pair, then the substantially co-linear pair and the wireless device are parallel and not co-linear.

17. The method of claim 5, wherein the control band communication is an out-of-band communication.

18. The method of claim 5, wherein performing the remedial action achieves the co-linear pairing between the first and second wireless devices in a substantially co-linear wireless device pair that permits wireless transmission of data between the first and second wireless devices in the data band.

19. A method of using compass orientation information to form communication pairings in a communication environment, comprising:
 a first control subsystem of a first wireless device interrogating a first compass element of the first wireless device to determine a first compass orientation of the first wireless device with respect to a fixed reference of the environment;
 a first transmit element of the first wireless device passively communicating in a control band its first compass orientation to other wireless devices within communication range in the environment;
 a first receive element of the first wireless device receiving in the control band one or more orientations corresponding to one or more other wireless devices in the environment;
 determining whether the first compass orientation is substantially aligned to any of the one or more orientations of the one or more other wireless devices received by the first receive element to identify one or more potentially co-linear wireless devices of the one or more other wireless devices;
 determining whether any of the one or more potentially co-linear wireless devices is substantially co-linear with the first wireless device to support wireless transmission of data between the first wireless device and the substantially co-linear wireless device; and
 the first control subsystem of the first wireless device selecting one of the substantially co-linear wireless devices with which to form a substantially co-linear pair capable of wireless transmission of data,
 wherein communications in the control band do not affect in-band operation of the wireless devices.

20. The method of claim 19, further comprising for any other of the substantially co-linear wireless devices not paired with the first wireless device performing a remedial action to mitigate interference, if present, between the first wireless device and the any other of the substantially co-linear wireless devices.

21. The method of claim 19, wherein for a potentially co-linear wireless device of the one or more potentially co-linear wireless devices identified, further comprising:
 the first receive element of the first wireless device detecting channel usage of the potentially co-linear wireless device in the control band;
 determining whether the channel usage of the potentially co-linear wireless device is approximate the channel usage of the first wireless device; and
 if the channel usage of the potentially co-linear wireless device is not approximate the channel usage of the first wireless device, the potentially co-linear wireless device is not co-linear to the first wireless device and the first wireless device is parallel and collocated with respect to the potentially co-linear wireless device.

22. The method of claim 21, wherein upon detection of interference between data transmission by the first wireless device along a first communication path and data transmission by the potentially co-linear wireless device, performing a remedial action to mitigate interference between the potentially co-linear wireless device and the wireless device.

23. The method of claim 21, wherein if the channel usage of the potentially co-linear wireless device is approximate the channel usage of the first wireless device, determining whether temporal alignment of data transmission along a first communication path by the first wireless device and along a second communication path by the potentially co-linear wireless device results in interference between the first and second communication paths.

24. The method of claim 23, further comprising performing a remedial action to mitigate interference between the first and second communication paths during periods of temporally aligned wireless data communication.

25. A wireless communication system that provides for the formation of co-linear device pairs of devices in a wireless communication environment, comprising:
 a first wireless device further comprising:
  a first control subsystem;
  a first transmitter element in cooperative arrangement with and controlled by the first control subsystem;
  a first compass element in cooperative arrangement with and controlled by the first control subsystem, wherein the first compass element is operable to determine a first compass orientation of the first wireless communication device with respect to a first fixed reference in the environment and the first control subsystem interrogates the first compass element for the first compass orientation of the first wireless device;

a first antenna element coupled to the first transmitter element;

a digital data source operatively coupled to the first control subsystem of the first wireless device;

a second wireless communication device further comprising:

a second control subsystem;

a first receiver element in cooperative arrangement with and controlled by the second control subsystem;

a second compass element in cooperative arrangement with and controlled by the second control subsystem, wherein the second compass element is operable to determine a second compass orientation of the second wireless device with respect to a second fixed reference in the environment and the second control subsystem interrogates the second compass element for the second compass orientation of the second wireless device; and a second antenna element coupled to the first receiver element; and a data sink operatively coupled to the second control subsystem of the second wireless device;

wherein one or both of the first and second control subsystems determine from the first and second compass orientations communicated in a control band to the first and second wireless devices whether the first and second wireless devices are sufficiently co-linear to support wireless transmission of data between the first and second wireless devices in a substantially co-linear device pair, and wherein control band communications do not affect in-band operation of the first and second wireless devices.

26. The system of claim 25, wherein if one or both of the first and second control subsystems determine from the first and second compass orientations that the first and second wireless devices are sufficiently co-linear to support wireless transmission of data between the first and second wireless devices, the first and second wireless devices are controlled by said first and second control subsystems, respectively, to form the substantially co-linear device pair.

27. The system of claim 25, wherein one or both of the first and second control subsystems determine from the first and second compass orientations if the first and second wireless devices are substantially parallel and in close enough proximity to cause interference and perform an interference mitigation action if interference exceeds an interference threshold.

28. The system of claim 25, wherein if one or both of the first and second control subsystems determine from the first and second compass orientations that the first and second wireless devices are not sufficiently co-linear to support wireless transmission of data, at least one of said first and second control subsystems function in support of a remedial action for achieving a sufficiently co-linear relationship for at least one of the first and second wireless devices.

29. A wireless communication device operable to operate in co-linear relation with another wireless device in a wireless communication environment, comprising:

a first control subsystem;

a first compass element in cooperative arrangement with and controlled by the first control subsystem, wherein the first compass element is operable to determine a first compass orientation of the first wireless communication device with respect to a first fixed reference in the environment and communicate the first compass orientation to the first control subsystem of the first wireless device;

a first transmit/receive element in cooperative arrangement with and controlled by the first control subsystem, wherein the first transmit/receive element is operable to receive a control band communication of a second compass orientation of a second wireless entity co-located within range of the first wireless device in the environment and communicate the second compass orientation to the first control subsystem; and a first antenna element coupled to the first transmit/receive element;

wherein the first control subsystem determines from the first and second compass orientations whether the first orientation of the first wireless devices is sufficiently co-linear with the second compass orientation to support wireless transmission of data in a data band between the first and second wireless devices in a substantially co-linear device pair.

30. The wireless device of claim 29, wherein the first control subsystem determines from the first and second compass orientations that the first and second wireless devices are sufficiently co-linear to support wireless transmission of data between the first and second wireless devices and the first control subsystem controls the first wireless device to form the substantially co-linear device pair with the second wireless device.

31. The wireless device of claim 29, wherein the first control subsystem determines from the first and second compass orientations if the first and second wireless devices are substantially parallel and in sufficient proximity to cause interference that exceeds an interference threshold and if so, the first control subsystem performs an interference mitigation action.

32. The wireless device of claim 29, wherein if the first control subsystem determines from the first and second compass orientations that the first and second wireless devices are not sufficiently co-linear to support wireless transmission of data, said first control subsystem performs a remedial action towards achieving a sufficiently co-linear relationship for the first wireless device.

* * * * *